US009900262B2

(12) United States Patent
Testa et al.

(10) Patent No.: US 9,900,262 B2
(45) Date of Patent: Feb. 20, 2018

(54) METHODS, NODES AND COMPUTER PROGRAM FOR ENABLING OF RESOURCE COMPONENT ALLOCATION

(71) Applicant: TELEFONAKTIEBOLAGET L M ERICSSON (PUBL), Stockholm (SE)

(72) Inventors: Patrizia Testa, Solna (SE); Joacim Halén, San Jose, CA (US)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 89 days.

(21) Appl. No.: 15/031,330

(22) PCT Filed: Oct. 23, 2013

(86) PCT No.: PCT/SE2013/051228
§ 371 (c)(1),
(2) Date: Apr. 22, 2016

(87) PCT Pub. No.: WO2015/060753
PCT Pub. Date: Apr. 30, 2015

(65) Prior Publication Data
US 2016/0261519 A1 Sep. 8, 2016

(51) Int. Cl.
*H04L 12/26* (2006.01)
*H04L 12/911* (2013.01)
*H04L 12/24* (2006.01)

(52) U.S. Cl.
CPC .......... *H04L 47/70* (2013.01); *H04L 41/5019* (2013.01); *H04L 43/026* (2013.01); *H04L 43/08* (2013.01)

(58) Field of Classification Search
CPC ... H04L 47/70; H04L 41/5019; H04L 43/026; H04L 43/08
See application file for complete search history.

(56) References Cited

U.S. PATENT DOCUMENTS

| 5,867,495 | A * | 2/1999 | Elliott | H04L 12/1485 370/352 |
| 6,335,927 | B1 * | 1/2002 | Elliott | H04L 12/14 370/352 |
| 6,611,517 | B1 | 8/2003 | Malik | |
| 6,909,708 | B1 * | 6/2005 | Krishnaswamy | H04L 12/1813 370/352 |
| 7,369,550 | B1 * | 5/2008 | Chiang | H04L 49/90 370/389 |

(Continued)

OTHER PUBLICATIONS

Harzog, B., APM Experts, White Paper: Infrastructure Performance Management for Virtualized Systems, CA Technologies, Jun. 2010.

(Continued)

*Primary Examiner* — Kevin Mew (57) ABSTRACT

A method, resource manager, and computer program performed by a resource manager in a communications network connected to at least two hosts for enabling of resource component allocation related to the hosts, comprising determining a metric of a resource component for performance monitoring of an application at the hosts, transmitting an instruction to measure the metric to respective host, receiving a respective resource frame of the application from respective host, determining resource allocation for the application based on the received resource frames.

17 Claims, 7 Drawing Sheets

(56) References Cited

U.S. PATENT DOCUMENTS

| | | | |
|---|---|---|---|
| 8,250,408 B1* | 8/2012 | Cohen | G06F 11/0709 714/25 |
| 8,850,263 B1* | 9/2014 | Yourtee | G06F 11/0709 714/20 |
| 9,749,036 B2* | 8/2017 | Agarwal | H04B 7/18515 |
| 2003/0093527 A1 | 5/2003 | Rolia | |
| 2003/0095571 A1* | 5/2003 | Speight | H04W 28/18 370/468 |
| 2005/0076154 A1* | 4/2005 | Chambliss | H04L 69/329 710/1 |
| 2005/0160813 A1* | 7/2005 | Imai | G01C 19/5607 73/504.12 |
| 2006/0059253 A1* | 3/2006 | Goodman | G06Q 10/10 709/223 |
| 2006/0245369 A1* | 11/2006 | Schimmelpfeng | H04L 43/08 370/252 |
| 2008/0172671 A1* | 7/2008 | Bouillet | G06F 11/3447 718/104 |
| 2009/0019442 A1* | 1/2009 | Liu | G06F 9/45533 718/102 |
| 2010/0131959 A1* | 5/2010 | Spiers | G06F 9/50 718/105 |
| 2010/0142448 A1* | 6/2010 | Schlicht | H04W 4/20 370/328 |
| 2010/0169490 A1* | 7/2010 | McNair | G06F 9/5083 709/226 |
| 2010/0315949 A1* | 12/2010 | Agarwal | H04B 7/18515 370/235 |
| 2012/0054763 A1* | 3/2012 | Srinivasan | G06F 9/5005 718/104 |
| 2013/0111470 A1* | 5/2013 | Bozek | G06F 9/4881 718/1 |
| 2013/0298170 A1* | 11/2013 | ElArabawy | H04W 28/0231 725/62 |
| 2013/0305376 A1* | 11/2013 | Chauhan | G06F 21/577 726/25 |
| 2014/0082165 A1* | 3/2014 | Marr | G06F 9/5044 709/222 |
| 2014/0082614 A1* | 3/2014 | Klein | G06F 9/45558 718/1 |
| 2014/0089510 A1* | 3/2014 | Hao | G06F 9/5072 709/226 |
| 2014/0165055 A1* | 6/2014 | Yanagisawa | G06F 9/5077 718/1 |
| 2014/0229608 A1* | 8/2014 | Bauer | H04L 41/142 709/224 |
| 2014/0302846 A1* | 10/2014 | Zou | H04W 28/0289 455/435.1 |
| 2014/0359608 A1* | 12/2014 | Tsirkin | G06F 9/45533 718/1 |
| 2015/0058475 A1* | 2/2015 | Earl | H04L 47/741 709/224 |
| 2015/0127810 A1* | 5/2015 | Cao | H04L 43/08 709/224 |
| 2015/0288592 A1* | 10/2015 | Baughman | H04L 43/16 709/224 |
| 2016/0277249 A1* | 9/2016 | Singh | H04L 67/02 |

OTHER PUBLICATIONS

Emeakaroha, V., Dissertation—Managing Cloud Service Provisioning and SLA Enforcement via Holistic Monitoring Techniques, Apr. 17, 2012.

Eden, M., A Survey of Performance Modeling and Analysis Issues in Resource Management Across x86-based Hypervisors in Enterprise Cloud Computing Deployments, May 4, 2011.

Siwczak, P., Some practical considerations for monitoring in OpenStack cloud, Sep. 4, 2012.

Phaal, et al., sFlow Host Structures, Jul. 2010.

* cited by examiner

METHODS, NODES AND COMPUTER PROGRAM FOR ENABLING OF RESOURCE COMPONENT ALLOCATION

This application is a 371 of International Application No. PCT/SE2013/051228, filed Oct. 23, 2013, the disclosure of which is fully incorporated herein by reference.

TECHNICAL FIELD

The present disclosure relates generally to methods, a resource manager, hosts and computer program in a communications network for enabling of resource component allocation related to the hosts.

BACKGROUND

It is becoming more common to share hardware platforms among applications. It is further becoming more common to separate computer hardware and applications by virtualizing the hardware. Such solutions may be described as shared environments, clouds, computer clouds, virtual environments, computer centers, hosting environments, or similar.

A shared environment may be created in different ways. An example of a structure is an application operating on an operating system, with the operating system running on a virtual machine. Compared with a single standalone solution may the virtual machine replace the physical hardware seen from the application or operating system perspective. A number of virtual machines may be operated on the same physical hardware. Virtual machines serving the same type of application may be relocated or parallelized between different physical hardware's depending on the applications needs or characteristics, such as availability, performance or capacity.

The virtual machine may be controlled by a hypervisor, where the hypervisor locally may manage the virtual machine on the physical hardware. The hypervisor may for example in a controlled way provide or allocate resources for the virtual machine such as bandwidth, CPU power (Central Processing Unit), memory capacity, or storage capacity. A single physical machine including all its software may sometimes be denoted a host.

On a higher level the hypervisor may be controlled by a resource manager or a cloud manager. The resource manager may control and instruct the hypervisor. The resource manager may for example have control over which applications that should be operated on which host, prioritization, start and stop of hosts.

There are obvious benefits with shared environments, such as the possibility of a plurality of applications sharing the same hardware, sharing functions such as databases, antivirus protection, firewalls, etc., which may be costly to maintain. Not at least to mention a descent physical environment with shell protection, cooling and constant electricity supply.

However, there are problems with the existing solutions for shared environments, clouds and similar computer center solutions. A problem is an increasing energy need with the growing shared environments, because both the computers themselves as well as the cooling for them require substantial energy supply. It may be desired to be able to turn off machines which not are used. Another problem is to gather adequate information about how to set up and manage applications running in a shared environment, depending on SLA's (Service Level Agreement) and resource demands. The structure in a shared environment may be complex and difficult to review.

SUMMARY

It is an object of the invention to address at least some of the problems and issues outlined above. It is possible to achieve these objects and others by using a method and an apparatus as defined in the attached independent claims.

According to one aspect, a method is provided for performance by a resource manager in a communications network connected to at least two hosts for enabling of resource component allocation related to the hosts. The method comprises determining a metric of a resource component for performance monitoring of an application at the hosts. The method comprises transmitting an instruction to measure the metrics to respective host. The method comprises receiving a respective resource frame of the application from respective host. The method comprises determining resource allocation for the applications based on the received resource frames.

According to another aspect, a method is provided for performance by a host in a communications network for collection of information related to performance of an application. The method comprises determining at least one metric of a resource component for monitoring of the application. The method comprises receiving an instruction to measure the metric to a hypervisor. The method comprises receiving the measured metric of the resource component from the hypervisor. The method comprises generating a resource frame comprising time slots. The method comprises arranging the measured metric in the time slots of the resource frame. The method comprises providing the resource frame to a resource manager.

According to another aspect, a resource manager in a communications network is provided, the resource manager connected to at least two hosts for enabling of resource component allocation related to the hosts. The resource manager is arranged to determine a metric of a resource component (130) for performance monitoring of an application at the hosts. The resource manager is arranged to transmit an instruction to measure the metrics to respective host. The resource manager is arranged to receive a respective resource frame of the application from respective host. The resource manager is arranged to determine resource allocation for the applications based on the received resource frames.

According to another aspect, a host in a communications network is provided for collection of information related to performance of an application. The host is arranged to determine at least one metric of a resource component (130) for monitoring of the application. The host is arranged to receive an instruction to measure the metric by a hypervisor. The host is arranged to measure the metric of the resource component by the hypervisor. The host is arranged to generate a resource frame comprising time slots. The host is arranged to arrange the measured metric in the time slots of the resource frame. The host is arranged to provide the resource frame to a resource manager.

According to another aspect, a computer program and a computer program product comprising computer readable code is provided which when run on a resource manager, causes the resource manager to behave as a resource manager.

According to another aspect, a computer program and a computer program product comprising computer readable code is which, when run on a host, causes the host to behave as a host.

The above method and apparatus may be configured and implemented according to different optional embodiments. In one possible embodiment, the resource frame may be generated to comprise time slots. The measured metric may be arranged in the time slots of the resource frame. In one possible embodiment, an SLA-parameter may be obtained. A metric may be determined based on the SLA-parameter. In one possible embodiment, the duration of a resource frame may correspond to a value specified by a threshold for the SLA-parameter. In one possible embodiment, a threshold value for the SLA parameter may be translated into a threshold value for the metric. In one possible embodiment, time slots of the same kind of metric of at least two resource components may be arranged in one resource frame.

In one possible embodiment, resource frames coming from the at least two hosts may be combined. In one possible embodiment, at least two resource frames may form an operations profile of an application using a shared environment. The operations profile may be dynamic over time. In one possible embodiment, a plurality of operations profiles may be matched, such that the sum for individual metrics may be kept within a predetermined threshold. In one possible embodiment, at least two applications dependency of the same resource component may be determined. The at least two applications may be matched based on their operations profiles such that the sum for individual metrics may be kept as near as possible to the predetermined threshold.

In one possible embodiment, a granularity of the metric may be determined. The transmitted instruction may include the determined granularity of the metric to measure. In one possible embodiment, resource allocation for the application may be determined on a time slot basis. The determined resource allocation may be transmitted to the hypervisor. In one possible embodiment, the duration of a time slot may be defined by a number of CPU clock cycles. In one possible embodiment, the duration of a resource frame may correspond to a value specified by at least an SLA, or the duration of a time slot may correspond to a value specified by at least the SLA. In one possible embodiment, a group of time slots in a resource frame may be dislocated relative to each other or have individual sizes.

Further possible features and benefits of this solution will become apparent from the detailed description below.

BRIEF DESCRIPTION OF DRAWINGS

The solution will now be described in more detail by means of exemplary embodiments and with reference to the accompanying drawings, in which.

DETAILED DESCRIPTION

Briefly described, a solution is provided for improved resource management and resource utilization in shared environments. The solution describes how to monitor different resources in a virtualized environment, when the resources may be shared by different applications. The solution may thereby enable to better estimate infrastructure performance.

The solution may remove the limits of current monitoring frameworks based on different solutions for monitoring different resources, systems, and networks. There are different problems with the existing solutions such as producing different and/or incompatible metrics which may make performance monitoring highly fragmented and challenging, which may be overcome with the present solution. The solution addresses the problem of how to organize and structure resources in a shared environment.

The solution may in a simple way link resources and systems performance by synchronizing on a resource frame basis the resources metrics of the applications using the resources. More specifically, the solution proposes to measure and collect same kind of metrics for resources in consecutive time slots for resources used by the applications and to monitor them in a larger resource frame comprising different consecutive time slots. That allows understanding of which and how resources are used, and which applications use them over each time slot. In a larger resource frame, the methods allows estimating application and infrastructure performance and determining how such performance depends on the measured resource metrics. It therefore may be exploited to control and adapt resources allocation on the basis of applications behavior.

Figure 1:
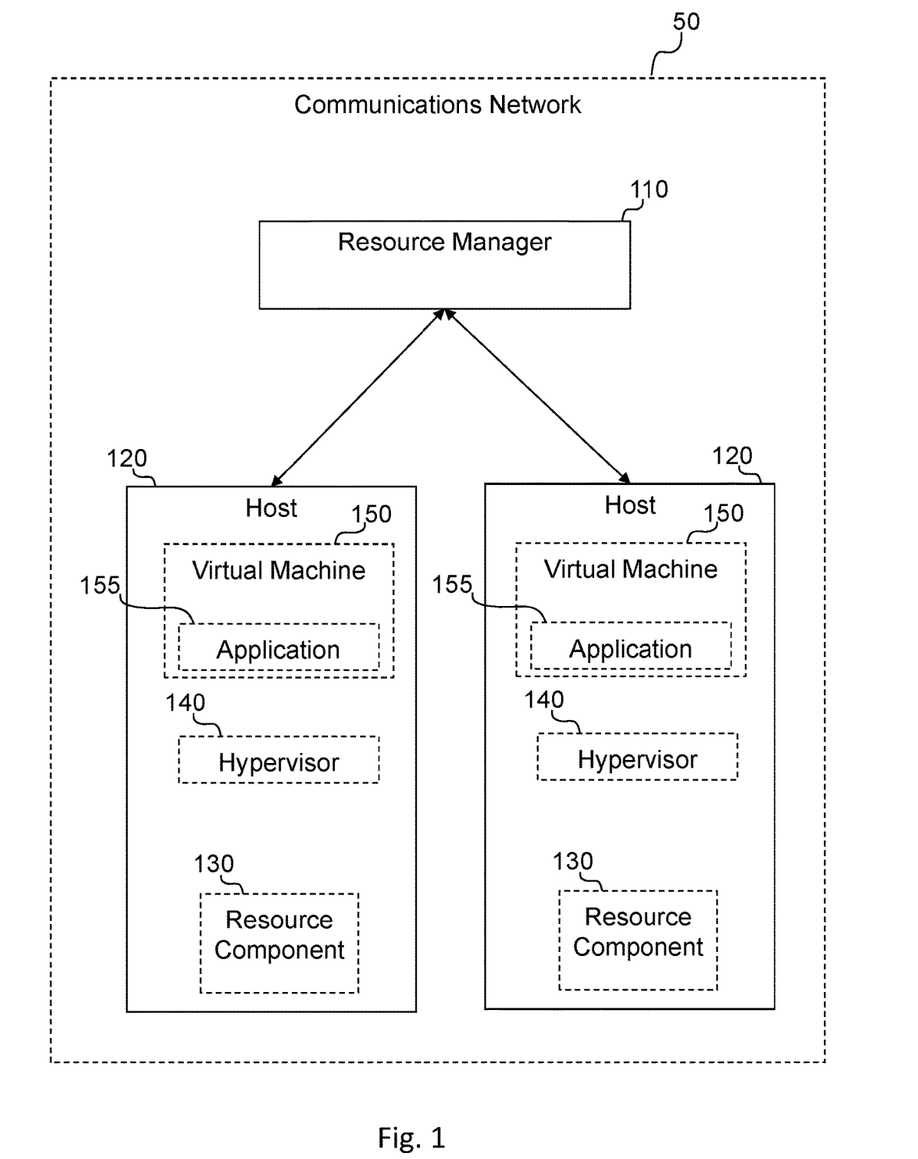
FIG. 1 is a block diagram illustrating the solution, according to some possible embodiments.

Now the solution will be described in more detail. FIG. 1 shows an overview of the solution in a communications network 50 with a resource manager 110 managing hosts 120. The solution may be operated in a shared environment, a datacenter or a cloud based solution. If it is a cloud based solution, the resource manager 110 may be denoted cloud manager or other similar terms for a node with management or controlling tasks. The hosts 120 may be arranged in different ways. An example of hosts 120 are shown in FIG. 1 with a resource component 130, controlled by a hypervisor 140 and a virtual machine 150. The virtual machine 150 may be an operating system serving an application 155.

Figure 2:
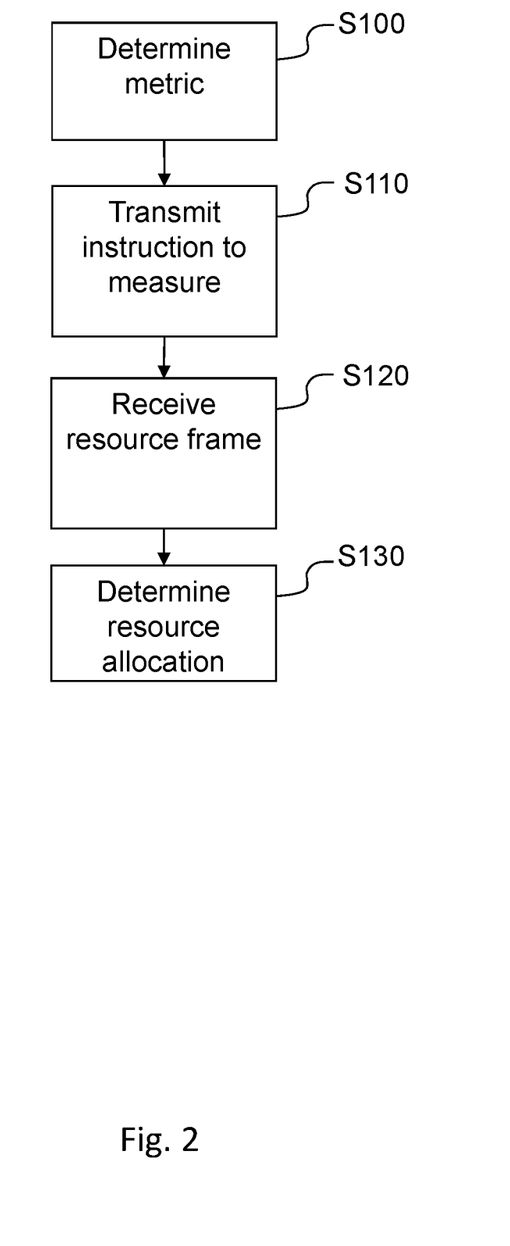
FIG. 2 is a flow chart illustrating a procedure in a resource manager, according to possible embodiments.

According to an embodiment illustrated by the flowchart in FIG. 2, a method performed by a resource manager 110 in a communications network 50 connected to at least two hosts 120 is provided for enabling of resource component allocation related to the hosts 120. The method comprises determination of a metric of a resource component 130 for performance monitoring of an application at the hosts 120 in a step S100. In a step S110, is an instruction transmitted to measure the metrics to respective host 120. In a step S120 is a respective resource frame 170 of the application 155 received from respective host 120. In a step S130 is resource allocation determined for the applications 155 based on the received resource frames 170.

Figure 3:
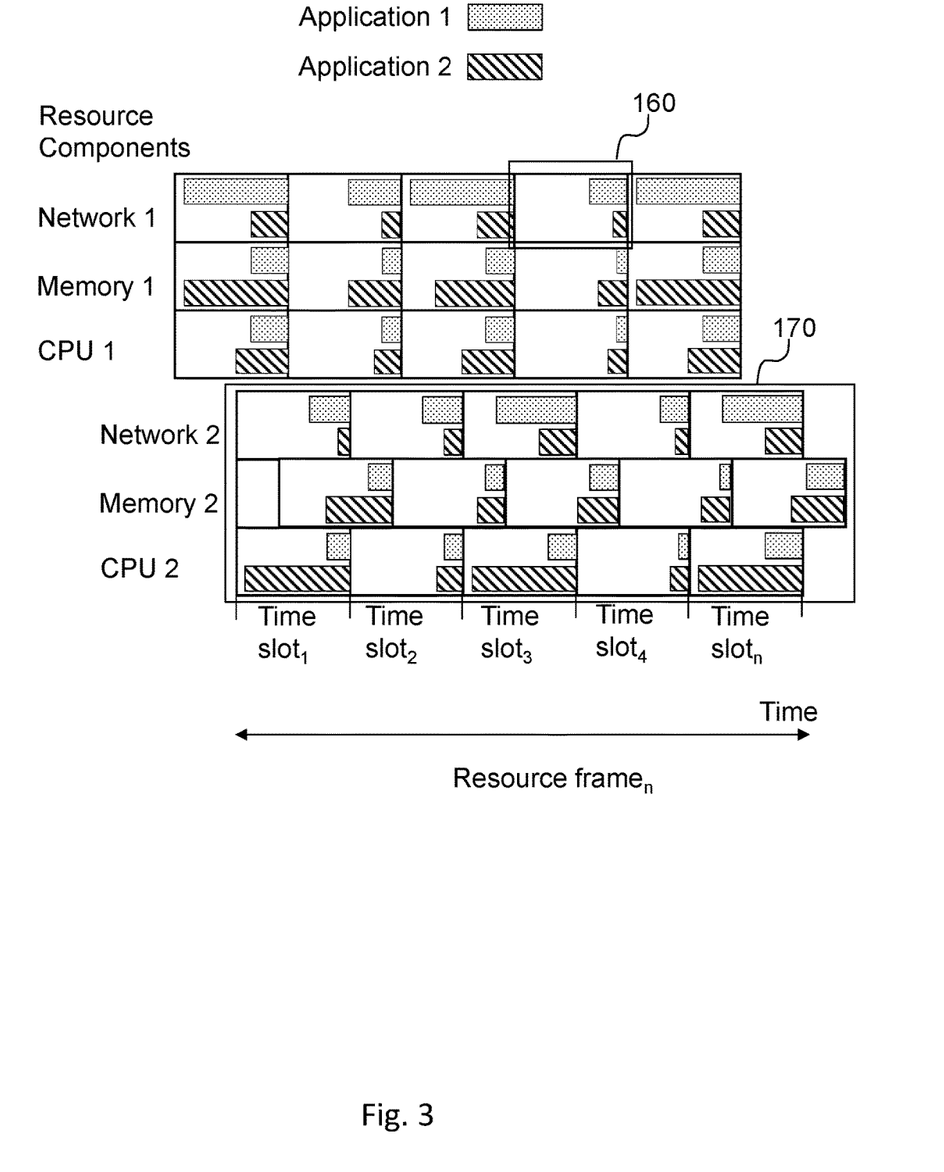
FIG. 3 illustrates an example in the solution.

In an embodiment illustrated in FIG. 3, the resource frame 170 may be generated to comprise time slots 160, wherein the measured metric is arranged in the time slots 160 of the resource frame 170. The figure is an illustrative non limiting example. As shown in the figure, resource components such as network interface, memory and CPU (Central Processing Unit) are shown. Time slots 160 are located in the resource frames 170. As illustrated in the figure, there is an application 1, which in the upper resource frame 170 is rather network intensive and the application 2 is rather memory intensive. In the lower resource frame 170, it may be interpreted that the application 1 still appears somewhat network intensive, however not as high as in the upper resource frame 170. As illustrated by the example, it may be interpreted that the application 2 is rather CPU intensive and further that the CPU load appears to be cyclic.

The upper resource frame 170 and the lower resource frame 170 may originate from the same physical host 120, but resource component 130 may be parallelized hardware. The upper resource frame 170 and the lower resource frame 170 may also originate from different physical hosts 120.

Figure 4:
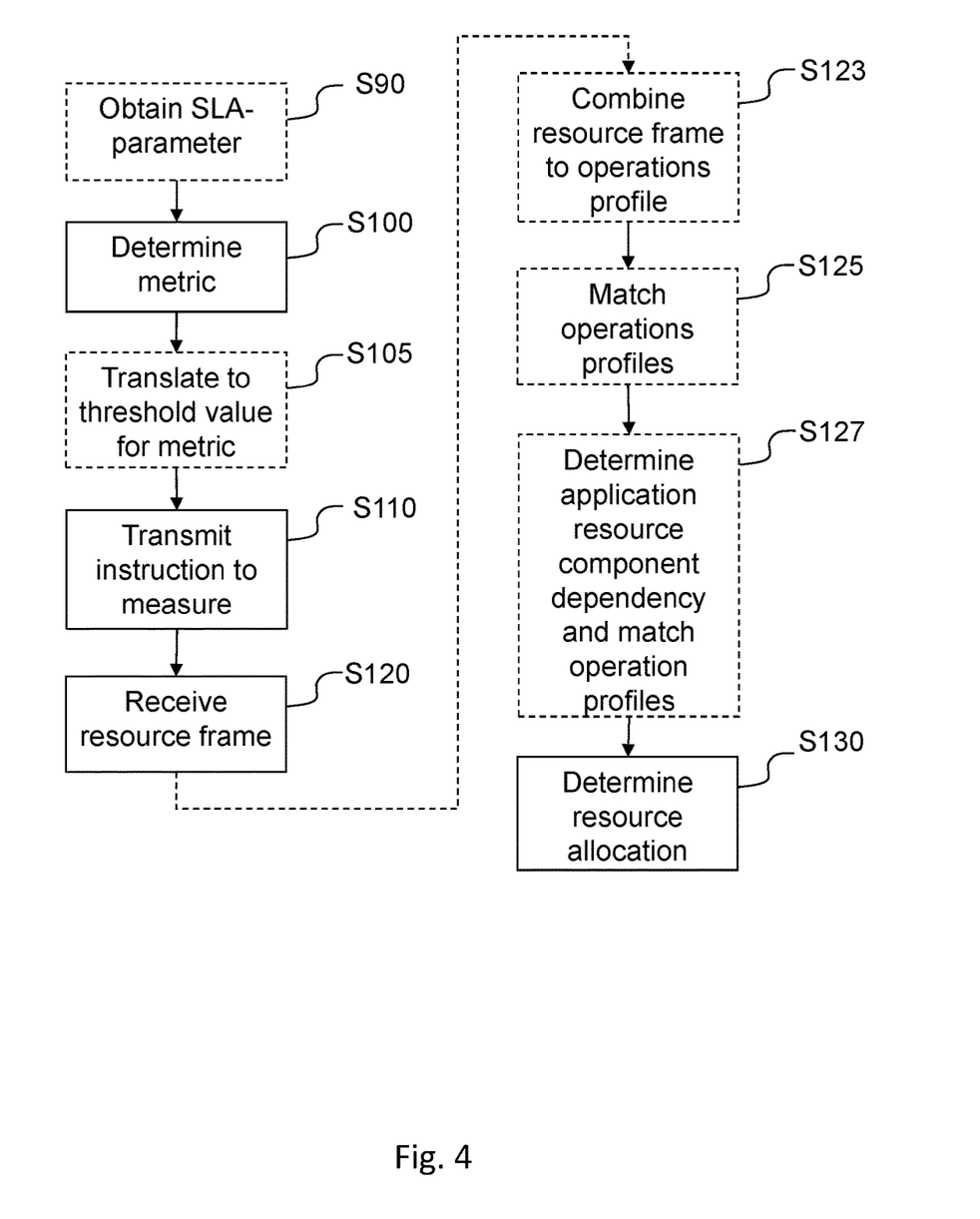
FIG. 4 is a flow chart illustrating a procedure in a resource manager, according to further possible embodiments.

FIG. 4 illustrates embodiments of the method. References in FIG. 2 correspond to references in FIG. 4. In an embodiment illustrated in the flow chart in FIG. 4, an SLA-parameter (Service Level Agreement) may be obtained in a step S90, wherein a metric may be determined based on the SLA-parameter. An SLA may comprise different technical aspects of what is required for an application acceptable performance. The technical aspects may be specified in at least one SLA-parameter. Such an SLA-parameter may be specifying minimum network bandwidth capacity, minimum CPU capacity (e.g. instructions per second or CPU response time), or memory capacity (e.g. memory size or read/write performance).

An advantage is that it might be possible to locate which resource component 130 that has caused a violation of an SLA-parameter. This may be enabled by determination of a metric based on the SLA-parameter.

In an embodiment the duration of a resource frame 170 may be corresponding to a value specified by a threshold for the SLA-parameter. Thereby it may be easy to compare and follow up measurements with SLA performance, potentially without any or with limited further processing of the resource frame 170.

In an embodiment illustrated in FIG. 4, a threshold value for the SLA-parameter may be translated in a step S105 into a threshold value for the metric. Thereby it may be easy to detect weather a threshold value is violated or not, potentially without any or with limited further processing.

In an embodiment time slots of the same kind of metric of at least two resource components 130 may be arranged in one resource frame. This may be advantageous, for example, in a situation where a host 120 has duplicated hardware resource components of the same kind, e.g. double CPU's or double network interfaces. Or it might be desired to compare the same kind of resource components 130 performance of different resource components 130.

In an embodiment the resource frames coming from the at least two hosts 120 may be combined in a step S123. The at least two resource frames 170 may be forming an operations profile of an application 155 using a shared environment 80. The operations profile may be dynamic over time. The profile may be dynamic for different reasons, an example is because workload or traffic load on the application 155 may be varying over time.

In an embodiment a plurality of operations profiles may be matched in a step S125, such that the sum for individual metrics may be kept within a predetermined threshold. In a scenario with a plurality of applications 155 potentially operated on different virtual machines 150, each application may have its own operations profile, depending on the particular application's 155 characteristics. One application 155 such as a storage application, may for example be using a lot of bandwidth. Another application 155 such as a weather forecast application, may for example be using a lot of CPU capacity. The operations profiles of the storage application and the weather forecast application may be suitable to match, because the applications together may be well utilizing different resource components 130 at a host 120.

In an embodiment at least two applications 155 may be determined in a step S127 as dependent of the same resource component. When there are at least two applications 155 dependent on the same type of resource component 130, the at least two applications operations profile may be matched, such that the sum for individual metrics are kept as near as possible to the predetermined threshold.

Figure 5:
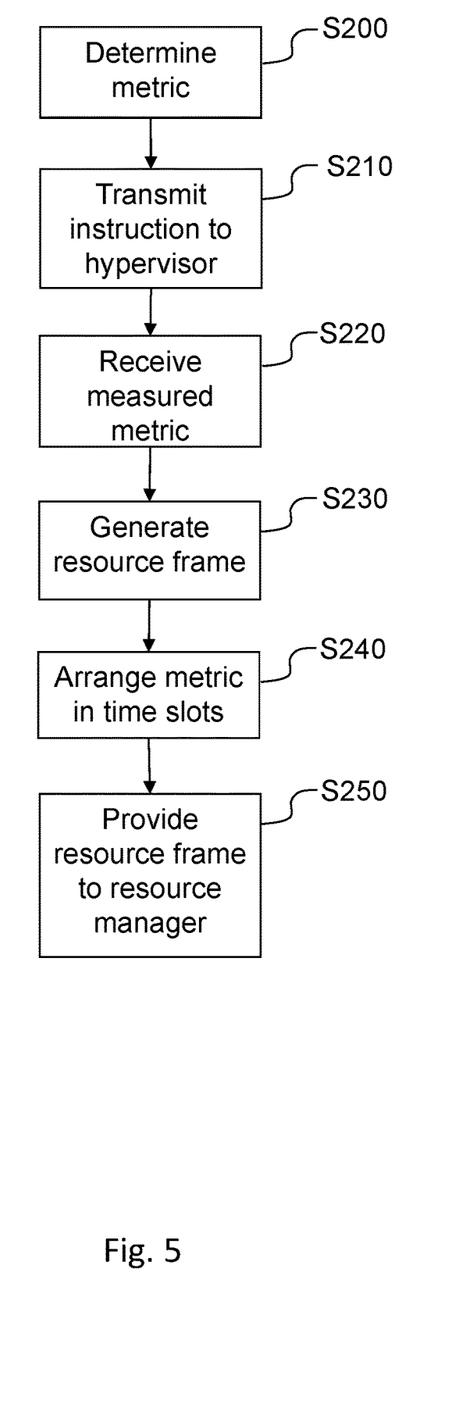
FIG. 5 is a flow chart illustrating a procedure in a host, according to possible embodiments.

According to an embodiment illustrated by the flowchart shown in FIG. 5, a method performed by a host 120 in a communications network 50 for collection of information related to performance of an application 155 is provided. The method comprises determination of at least one metric of a resource component 130 in a step S200 for monitoring of the application 155. In a step S210 an instruction is transmitted to measure the metric to a hypervisor 140. In a step S220 the measured metric of the resource component is received from the hypervisor 140. In a step S230 a resource frame 170 comprising time slots 160 is generated. In a step S240 the measured metric is arranged in the time slots 160 of the resource frame 170. In a step S250 the resource frame 170 is provided to a resource manager 110.

In an embodiment a granularity of the metric may be determined. When the instruction to measure is transmitted to the hypervisor 140, the instruction may include the determined granularity of the metric to measure. The granularity may indicate with which interval a metric should be measured. A few examples: Measuring momentary memory usage, where the granularity may tell the interval between each measurement. Measuring network activity, either momentary network load or amount of data transported where the granularity may indicate a time interval between each measurement or the resolution of the measurement. Granularity may also be denoted time slot size, or time slot size for metrics.

In an embodiment, the measured metric may come from a virtual resource manager.

In an embodiment resource allocation for the application 155 may be determined on a time slot basis. When a resource allocation is determined for the application 155, the resource allocation may be transmitted to the hypervisor 140. This means that potentially allocation of resource components 230 for an application 155 may be changed with a time interval corresponding to the time interval of the resource frame 170.

In an embodiment, when the resource allocation may be needed to be changed based on time slot basis, the new resource allocation may be transmitted to the hypervisor 140. The new resource allocation may be transmitted a to resource scheduler.

In an embodiment the duration of a time slot 160 may be defined by a number of CPU clock cycles. To achieve a fine granularity or a fine resolution of the measurements, it may be suitable to use a number of CPU clock cycles to define the length of a time slot 160, more accurate than a time period.

In an embodiment the duration of a resource frame 170 may correspond to a value specified by at least an SLA. The duration of a time slot 160 may correspond to a value specified by at least the SLA.

A time slot 160 may be determined or specified by a local SLA. A resource frame 170 may be determined or specified by a global SLA.

In an embodiment a group of time slots 160 in a resource frame 170 are dislocated relative to each other or have individual sizes. I.e. start, stop, or the length of time slots 160 or resource frames 170 do not need to be coordinated. Time slots 160 may be dislocated relative to each other within a resource frame 170. Resource frames 170 may be dislocated relative to each other. Dislocated means that an absolute start time or an absolute stop time may be different for parallel time slots 160 or resource frames 170. A non-limiting example of a dislocation is illustrated in FIG. 3.

Figure 6:
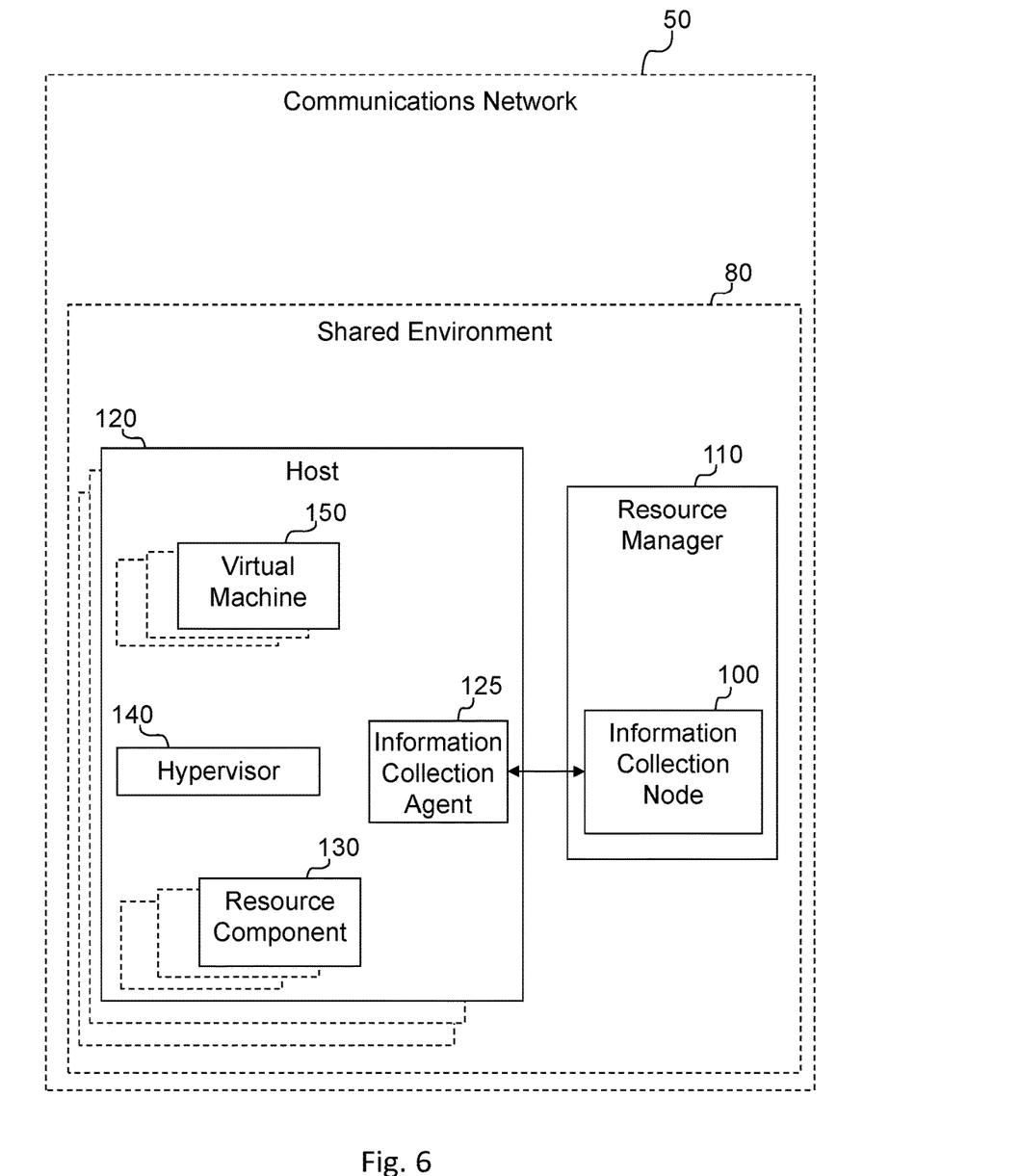
FIG. 6 is a block diagram illustrating a resource manager and a host in more detail, according to further possible embodiments.

FIG. 6 illustrates an example of a resource manager 110. According to an embodiment is a resource manager 110 in a communications network 50 connected to at least two hosts 120 for enabling of resource component allocation related to the hosts 120. The resource manager 110 is arranged to determine a metric of a resource component 130 for performance monitoring of an application at the hosts 120. The resource manager 110 is arranged to transmit an instruction to measure the metrics to respective host 120. The resource manager 110 is arranged to receive a respective resource frame 170 of the application 155 from respective host 120. The resource manager 110 is arranged to determine resource allocation for the applications 155 based on the received resource frames 170.

The instruction to measure the metrics to respective host 120 may be transmitted from an information collection node 100. The respective resource frame 170 of the application 155 from respective host 120 may be received by the information collection node 100. The information collection node 100 may be comprised by the resource manager 110.

In an embodiment the resource manager 110 may be arranged to generate the resource frame 170 to comprise time slots 160. The measured metric may be arranged in the time slots 160 of the resource frame 170.

In an embodiment, the resource frame 170 may be built by the information collection node 100 comprised by the resource manager 110. Information to build the resource frame 170, such as time slots 160, may be coming from information collection agents 125. The information collection agents 125 may be comprised by the hosts 120. An information collection agent 125 may receive new resource allocation from the resource manger 110, or from the information collection node 100 comprised by the resource manger 110. When the information collection agent 125 receives new resource allocation, the information collection agents 125 may be acting as a local resource manager.

In an embodiment the resource manager 110 may be arranged to obtain an SLA-parameter. A metric may be determined based on the SLA-parameter.

In an embodiment the duration of a resource frame 170 may correspond to a value specified by a threshold for the SLA-parameter.

In an embodiment the resource manager 110 may be arranged to translate a threshold value for the SLA parameter into a threshold value for the metric.

In an embodiment the resource manager 110 is arranged to combine resource frames coming from the at least two hosts 120. At least two resource frames 170 may form an operations profile of an application 155 using a shared environment 80. The operations profile may be dynamic over time. A non-limiting example: For an office application the workload may increase in the morning, slightly decrease over lunch time and decrease to a low level over the night. Another non limiting example is a streaming movie service, which may be delivering movies 24-by-7, but with peaks in the evenings and especially through the weekends.

In an embodiment the resource manager may be arranged to arrange time slots of the same kind of metric of at least two resource components 130 in one resource frame.

In an embodiment the resource manager 110 may be arranged to match a plurality of operations profiles. The operations profiles may be matched such that the sum for individual metrics may be kept within a predetermined threshold. By matching of operations profiles, applications with different work load characteristics may be combined in such a way, that no single resource component 130 may be overloaded or violating an SLA. But the applications may be combined in a way such that the resource components of the hosts 120 are well utilized. An advantage is thereby that it may be possible to relocate applications to fewer common hosts 120, and shut down excessive hosts 120. Thereby it may be possible to save energy.

In an embodiment the resource manager 110 may be arranged to determine at least two applications 155 dependency of the same resource component. The at least two applications 155 may be matched based on their operations profiles such that the sum for individual metrics are kept as near as possible to the predetermined threshold. An advantage is thereby that applications 155 may be combined such that resource components 130 are fully utilized and potentially without two resource components overloading the same resource component 130.

FIG. 6 further illustrates an example of an embodiment, with a host 120 in a communications network 50 for collection of information related to performance of an application 155. The host 120 is arranged to determine at least one metric of a resource component 130 for monitoring of the application 155. The host 120 is arranged to transmit an instruction to measure the metric to a hypervisor 140. The host 120 is arranged to receive the measured metric of the resource component from the hypervisor 140. The host 120 is arranged to generate a resource frame 170 comprising time slots 160. The host 120 is arranged to arrange the measured metric in the time slots 160 of the resource frame 170. The host 120 is arranged to provide the resource frame 170 to a resource manager 110.

In an embodiment, the host 120 may be arranged to determine a granularity of the metric. The transmitted instruction may include the determined granularity of the metric to measure.

In an embodiment, the host 120 may be arranged to determine resource allocation for the application 155 on a time slot basis. The determined resource allocation may be transmitted to the hypervisor 140.

In an embodiment the duration of a time slot 160 may be defined by a number of CPU clock cycles.

In an embodiment the duration of a resource frame 170 may correspond to a value specified by at least an SLA. An option may be that the duration of a time slot 160 may correspond to a value specified by at least the SLA.

In an embodiment a group of time slots 160 in a resource frame 170 may be dislocated relative to each other or have individual sizes.

Figure 7A:
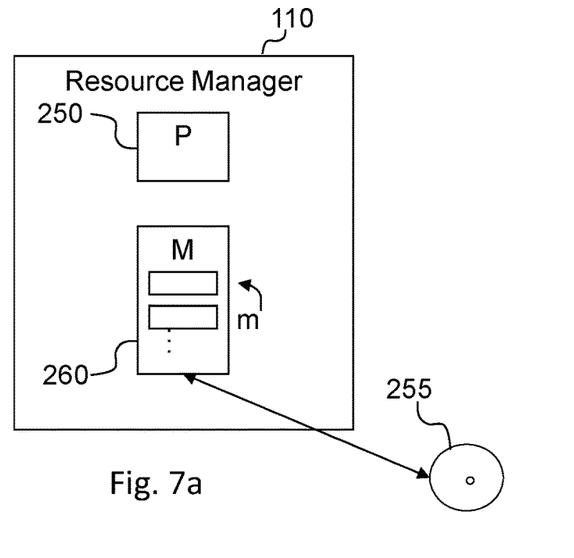
FIG. 7a is a block diagram illustrating a processor and a memory in a resource manager, according to possible embodiments.
Figure 7B:
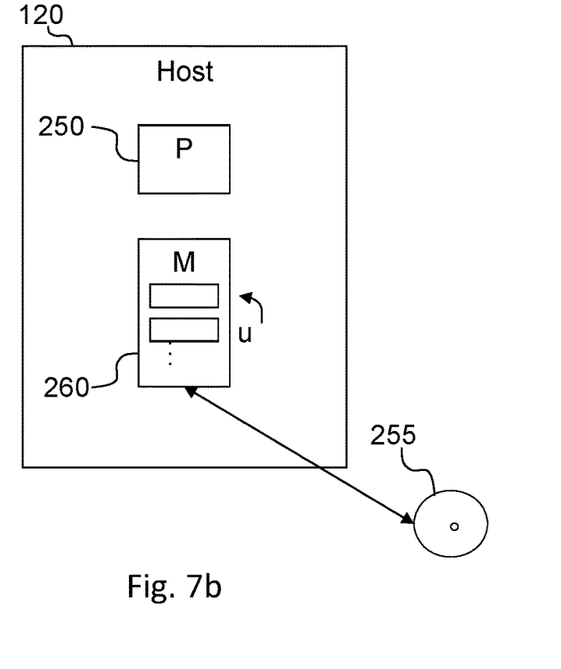
FIG. 7b is a block diagram illustrating a processor and a memory in a host, according to possible embodiments.

Looking at FIG. 7a and FIG. 7b, the described resource manger 110 and the hosts 120 described above may be implemented, by means of program units of a respective computer program comprising code means which, when run by processors "P" 250 causes the resource manger 110 and the host 120 to perform the above-described actions. The processors P 250 may comprise a single Central Processing Unit (CPU), or could comprise two or more processing units. For example, the processors P 250 may include general purpose microprocessors, instruction set processors and/or related chips sets and/or special purpose microprocessors such as Application Specific Integrated Circuits (ASICs). The processors P 250 may also comprise a storage for caching purposes.

Each computer program may be carried by computer program products "M" 260 in the resource manger 110 and the host 120, in the form of memories having a computer readable medium and being connected to the processor P. The computer program products may be carried by a medium 255, such as CD, DVD, flash memory, or downloadable objects. Each computer program product M 260 or memory thus comprises a computer readable medium on which the computer program is stored e.g. in the form of computer program units "u". For example, the memories M 260 may be a flash memory, a Random-Access Memory (RAM), a Read-Only Memory (ROM) or an Electrically Erasable Programmable ROM (EEPROM), and the program unit's u could in alternative embodiments be distributed on different computer program products in the form of memories within the resource manger 110 and the host 120.

While the solution has been described with reference to specific exemplary embodiments, the description is generally only intended to illustrate the inventive concept and should not be taken as limiting the scope of the solution. For example, the terms "resource manager", "host" and "shared environment" have been used throughout this description, although any other corresponding nodes, functions, and/or parameters could also be used having the features and characteristics described here. The solution is defined by the appended claims.

The invention claimed is:

1. A method performed by a resource manager in a communications network connected to at least two hosts for enabling of resource component allocation related to the hosts, the method comprising:
determining a metric of a resource component for performance monitoring of an application at the hosts;
transmitting an instruction to measure the metric to each respective host;
receiving a respective resource frame of the application from each respective host;
determining resource allocation for the application based on the received resource frames; and
combining resource frames coming from the at least two hosts;
wherein at least two resource frames form an operations profile of an application using a shared environment; and
wherein the operations profile is dynamic over time.

2. The method according to claim 1, wherein:
the resource frame is generated to comprise time slots, and wherein
the measured metric is arranged in the time slots of the resource frame.

3. The method according to claim 1 comprising:
obtaining a Service Level Agreement (SLA)-parameter, wherein a metric is determined based on the SLA-parameter.

4. The method according to claim 1, wherein
the duration of a resource frame corresponds to a value specified by a threshold for the SLA-parameter.

5. The method according to claim 1, wherein
a threshold value for the SLA-parameter is translated into a threshold value for the metric.

6. The method according to claim 1, wherein
time slots of the same kind of metric of at least two resource components are arranged in one resource frame.

7. The method according to claim 1, wherein
a plurality of operations profiles are matched, such that the sum for individual metrics are kept within a predetermined threshold.

8. The method according to claim 7, comprising:
determining at least two applications' dependency of the same resource component,
wherein the at least two applications are matched based on their operations profiles such that the sum for individual metrics are kept as near as possible to the predetermined threshold.

9. A resource manager in a communications network connected to at least two hosts for enabling of resource component allocation related to the hosts, wherein the resource manager includes processing circuitry coupled to a memory that stores computer-readable code which, when executed by the processing circuitry, causes the resource manager to:
determine a metric of a resource component for performance monitoring of an application at the hosts;
transmit an instruction to measure the metrics to each respective host;
receive a respective resource frame of the application from each respective host;
determine resource allocation for the applications based on the received resource frames; and
combine resource frames coming from the at least two hosts;
wherein at least two resource frames form an operations profile of an application using a shared environment; and
wherein the operations profile is dynamic over time.

10. The resource manager according to claim 9, wherein:
the resource manager is arranged to generate the resource frame to comprise time slots,
wherein the measured metric is arranged in the time slots of the resource frame.

11. The resource manager according to claim 9, wherein:
the resource manager is arranged to obtain a Service Level Agreement (SLA)-parameter,
wherein a metric is determined based on the SLA-parameter.

12. The resource manager according to claim 9, wherein
the duration of a resource frame corresponds to a value specified by a threshold for the SLA-parameter.

13. The resource manager according to claim 9, wherein
the resource manager is arranged to translate a threshold value for the SLA parameter into a threshold value for the metric.

14. The resource manager according to claim 9, wherein
the resource manager is arranged to arrange time slots of the same kind of metric of at least two resource components in one resource frame.

15. The resource manager according to claim 9, wherein
the resource manager is arranged to match a plurality of operations profiles, such that the sum for individual metrics are kept within a predetermined threshold.

16. The resource manager according to claim 15, wherein:
the resource manager is arranged to determine at least two applications' dependency of the same resource component,
wherein the at least two applications are matched based on their operations profiles such that the sum for individual metrics are kept as near as possible to the predetermined threshold.

17. A non-transitory computer-readable medium storing computer readable code which, when run on a resource manager in a communications network, causes the resource manager to allocate resource component allocations for at least two connected hosts, wherein the resource manager is caused to:
determine a metric of a resource component for performance monitoring of an application at the hosts;
transmit an instruction to measure the metrics to each respective host;
receive a respective resource frame of the application from each respective host;
determine resource allocation for the applications based on the received resource frames; and
combine resource frames coming from the at least two hosts;
wherein at least two resource frames form an operations profile of an application using a shared environment; and
wherein the operations profile is dynamic over time.

* * * * *